US009442326B2

(12) United States Patent
Oono et al.

(10) Patent No.: US 9,442,326 B2
(45) Date of Patent: Sep. 13, 2016

(54) LIQUID CRYSTAL DISPLAY DEVICE

(71) Applicant: Japan Display Inc., Minato-ku (JP)

(72) Inventors: Atsuko Oono, Saitama-ken (JP); Tatsuaki Kuji, Saitama-ken (JP)

(73) Assignee: Japan Display Inc., Minato-ku (JP)

( * ) Notice: Subject to any disclaimer, the term of this patent is extended or adjusted under 35 U.S.C. 154(b) by 37 days.

(21) Appl. No.: 13/960,137

(22) Filed: Aug. 6, 2013

(65) Prior Publication Data

US 2014/0055735 A1   Feb. 27, 2014

(30) Foreign Application Priority Data

Aug. 23, 2012 (JP) ................................ 2012-184023

(51) Int. Cl.
*G02F 1/1339* (2006.01)
*G02F 1/1341* (2006.01)

(52) U.S. Cl.
CPC ......... *G02F 1/13394* (2013.01); *G02F 1/1341* (2013.01)

(58) Field of Classification Search
None
See application file for complete search history.

(56) References Cited

U.S. PATENT DOCUMENTS

| | | | | | |
|---|---|---|---|---|---|
| 5,815,232 | A | * | 9/1998 | Miyazaki | G02F 1/13394 349/106 |
| 6,163,357 | A | * | 12/2000 | Nakamura | 349/155 |
| 7,609,359 | B2 | * | 10/2009 | Sekiguchi | 349/190 |
| 7,656,495 | B2 | * | 2/2010 | Weng et al. | 349/153 |
| 7,751,007 | B2 | * | 7/2010 | Morimoto et al. | 349/123 |
| 2002/0171800 | A1 | * | 11/2002 | Miyazaki | G02F 1/13394 349/156 |
| 2005/0237470 | A1 | * | 10/2005 | Kadotani | G02F 1/13394 349/155 |
| 2006/0170854 | A1 | * | 8/2006 | Han et al. | 349/153 |
| 2007/0091246 | A1 | * | 4/2007 | Sugimoto | 349/153 |
| 2007/0279572 | A1 | * | 12/2007 | Yonemura | 349/153 |
| 2007/0291216 | A1 | * | 12/2007 | Chan et al. | 349/153 |
| 2008/0129946 | A1 | * | 6/2008 | Chan et al. | 349/153 |
| 2009/0231516 | A1 | * | 9/2009 | Okada et al. | 349/73 |
| 2010/0225873 | A1 | * | 9/2010 | Takahashi | 349/155 |
| 2012/0033162 | A1 | * | 2/2012 | Ahn | 349/106 |
| 2012/0280957 | A1 | * | 11/2012 | Yu et al. | 349/153 |
| 2013/0308084 | A1 | * | 11/2013 | Niwano | G02F 1/1339 349/155 |

FOREIGN PATENT DOCUMENTS

| | | |
|---|---|---|
| JP | 2003-121860 | 4/2003 |
| JP | 2003-279998 | 10/2003 |
| JP | 2007-193153 | 8/2007 |
| JP | 2012-58423 | 3/2012 |
| WO | WO 2007/119409 A1 | 10/2007 |
| WO | WO 2012/060302 A1 | 5/2012 |

OTHER PUBLICATIONS

U.S. Appl. No. 13/960,102, filed Aug. 6, 2013, Oono.
Office Action issued Apr. 19, 2016, in Japanese Patent Application No. 2012-184023, filed Aug. 23, 2012 (with English-language Translation).

* cited by examiner

*Primary Examiner* — Ryan Crockett
(74) *Attorney, Agent, or Firm* — Oblon, McClelland, Maier & Neustadt, L.L.P.

(57) ABSTRACT

An array substrate including a first substrate, an under-resin layer formed on one surface of the first substrate, a display area, and an integrated circuit mounted on a mounting portion located apart from the under-resin layer. A counter substrate is arranged facing the array substrate and includes a second substrate and a shield layer formed on the second substrate for shielding a peripheral area surrounding the display area. A plurality of pillar-shaped spacers is arranged on the under-resin layer in the peripheral area, the pillar-shaped spacers formed in the seal material. Spacer area density of the pillar-shaped spacers arranged in the peripheral area adjacent to the mounting portion seen from the counter substrate side is larger than that of the pillar-shaped spacers arranged in the peripheral area not adjacent to the mounting portion.

7 Claims, 5 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2012-184023 filed Aug. 23, 2012, the entire contents of which are incorporated herein by reference.

FIELD

Embodiments described herein relate generally to a liquid crystal display device.

BACKGROUND

The liquid crystal display device generally includes an array substrate, a counter substrate and a liquid crystal layer held therebetween. The array substrate and the counter substrate respectively equipped with electrodes are formed of a pair of glasses, and attached by a seal material in a peripheral area.

In a color active-matrix type liquid crystal display device, for example, the array substrate includes switching elements such as thin film transistors (TFT) formed of poly-silicon, pixel electrodes, signal lines, gate lines connected with the switching element. The counter substrate includes a counter electrode and a color filter. The array substrate and the counter substrate are attached by the seal material arranged in a peripheral area. In the color active-matrix type liquid crystal display device, respective polarizer plates are attached on both outer surfaces of the array substrate and the counter substrate. Color images are displayed by switching the switching element.

A shield layer is provided between color filters colors in different colors each other in a peripheral area. The color filters run on the shield layer to prevent generation of a light leak resulting from patterning accuracy.

Conventionally, a method in which plastic beads with uniform particle diameter are scattered between the substrates is used as a spacer for keeping a cell gap between the two substrates uniform. Recently, a pillar shaped spacer formed on one of the substrates has been used. The method is effective in achieving the uniform cell gap by selectively arranging the spacers and raising accuracy of a spacer height. The method of pasting two substrates together is also important for achieving the uniform gap.

There are two types of forming the liquid crystal layer and attaching the pair of substrates by the seal material. The first method uses an injecting hole formed in the seal material arranged in the peripheral area of the array substrate. After attaching the substrates in a vacuum condition, the gap is formed by applying pressure to the substrates. The second method is called One Drop Fill (ODF) method. After attaching the substrates in the vacuum condition in a state in which a predetermined amount of liquid crystal material was dropped in a region surrounded with the seal material on the array substrate, the state is changed from the vacuum condition to an atmosphere condition. The seal material is crushed by a pressure difference between the inside pressure of the cell gap and outside pressure, thereby a predetermined cell gap is formed. Since the ODF method has advantages such as shorten of tact time, effective use of materials and high gap accuracy, the ODF method is widely used for forming the liquid crystal layer.

Generally, in the ODF method, spacers are arranged in the seal material. Thereby, when the vacuum state is turned to the atmosphere pressure state, excessive crushing of the seal material can be prevented, and a cell gap distortion in the display area can be controlled.

A display defect is resulted when variations in the dropped amount of the liquid crystal materials and cell volume exist, and when the volume of the liquid crystal materials is excess or too little. Especially, in case the amount of the liquid crystal material is excess, the display defect corresponding to the cell form is generated at the time of pasting the array substrate and the counter substrate together.

For example, if the cell gap in the seal material is sufficiently large with respect to the display area, a cross-sectional view of the cell becomes a hard drum form. In case the amount of the liquid crystal materials is excess, since the liquid crystal materials are more stored in the region where the cell gap is larger, the region in which the cell gap is larger is sighted as an unevenness gap in the circumference. That is, the circumference in the display area colors yellow. On the other hand, when the seal material is crushed and becomes thin, the cell becomes a paunch form. In case the liquid crystal materials are excessive, the liquid crystal materials are more stored in the display area, and the stored region is sighted as unevenness. Even when the amount of the liquid crystal materials is slightly excessive, if the cell is stood while being warmed in a manufacturing process, the liquid crystal materials in a central portion move to a lower side and stored there by its own weight, and the circumference of the lower side is sighted as unevenness (gravity unevenness).

In order to raise adhesiveness of the seal material between the seal material and the array substrate, it is necessary to remove a portion of an under-resin film formed on the array substrate so that a predetermined area is secured, in which the seal material directly contacts with a non-organic film such as a silicon-oxide.

Moreover, there is a tendency that a seal material arrangement region is made narrow as the demand for making a narrow frame becomes strong. Accordingly, if the predetermined area is secured to contact the seal material with the non-organic film, a restriction arises in the spacer arrangement in the seal material.

Moreover, the spacer in the seal material is simultaneously formed with the spacer which forms the cell gap between the array substrate and the counter substrate in the display area. Accordingly, when the spacer in the seal material is formed in a pattern end of an under-resin film used as a base, there is a tendency that the height of the spacer in the seal material becomes lower compared with the spacer in the display area by leveling phenomenon.

The spacer height formed in the pattern end of the under-resin film is dependent on the removed area of the under-resin film. The under-resin film in a mounting portion for mounting ICs on the array substrate is also removed. Accordingly, the total removed area of the under-resin film between peripheral areas of adjacent display panels becomes large if the mounting portion is provide between the peripheral areas of the adjacent display panels comparing with the peripheral areas not adjacent to the mounting portion. As a result, the height of the spacer formed in the pattern end of the under-resin film adjacent to the mounting portion becomes lower comparing with that of the spacer arranged in the peripheral area not adjacent to the mounting portion. As a result, the spacer height in the seal material adjacent to the mounting portion tends to become remarkably lower comparing with the height of the spacer in the display area.

In the manufacturing process, when the display panel is vertically put by turning the mounting portion on a down side, display unevenness may be resulted while being warmed in the manufacturing process.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: an array substrate including a first substrate, an under-resin layer formed on one surface of the first substrate, a plurality of pixel electrodes formed on the under-resin layer in a matrix shape and forming a display area, and an integrated circuit mounted on a mounting portion located apart from the under-resin layer; a counter substrate arranged facing the array substrate and including a second substrate and a shield layer formed on the second substrate for shielding a peripheral area of the display area: a seal material for attaching the array substrate and the counter substrate in the peripheral area; a plurality of pillar-shaped spacers arranged on the under-resin layer in the peripheral area, the pillar-shaped spacers formed in the seal material; and a liquid crystal layer held in a space surrounded with the array substrate, the counter substrate and the seal material; wherein spacer area density of the spacers arranged in the peripheral area adjacent to the mounting portion seen from the counter substrate side is larger than the spacer area density of the spacers arranged in the peripheral area not adjacent to the mounting portion, here the spacer area density means a ratio of total cross-sectional areas of the spacers arranged in a unit area to the unit area.

The liquid crystal display device according to an embodiment includes an array substrate, a counter substrate and a seal material which pastes the array substrate and the counter substrate, a plurality of pillar-shaped spacers formed on the array substrate, and a liquid crystal layer held in a space surrounded with the array substrate, the counter substrate, and the seal material.

The array substrate includes a first substrate, an under-resin layer formed on one surface of the first substrate, a plurality of pixel electrodes arranged in the shape of a matrix on the under-resin layer for forming the display area, and a mounting portion arranged apart from the under-resin layer for mounting ICs.

The counter substrate includes a second substrate and a shield layer formed on a second substrate for shielding a peripheral area adjacent to the display area. The seal material pastes the array substrate and the counter substrate in the peripheral area.

The plurality of pillar shaped spacers is formed in the seal material on the under-resin layer arranged in the peripheral area. Pillar-shaped spacers are also arranged in the display area.

In the pillar-shaped spacers formed in the seal material, a spacer area density of the pillar-shaped spacers formed in the seal material at a mounting end of the peripheral area adjacent to the mounting portion at the time of seeing the pillar-shaped spacers from the counter substrate side is larger compared with the spacer area density of the spacers arranged in the seal material at other ends of the peripheral area. Here, the spacer area density means a ratio of total cross-sectional areas of the spacers arranged in a unit area to the unit area.

According to this embodiment described above, it becomes possible to improve the thickness of the seal material at the mounting end and to control the decrease in the display quality due to the gravity unevenness.

Figure 1:
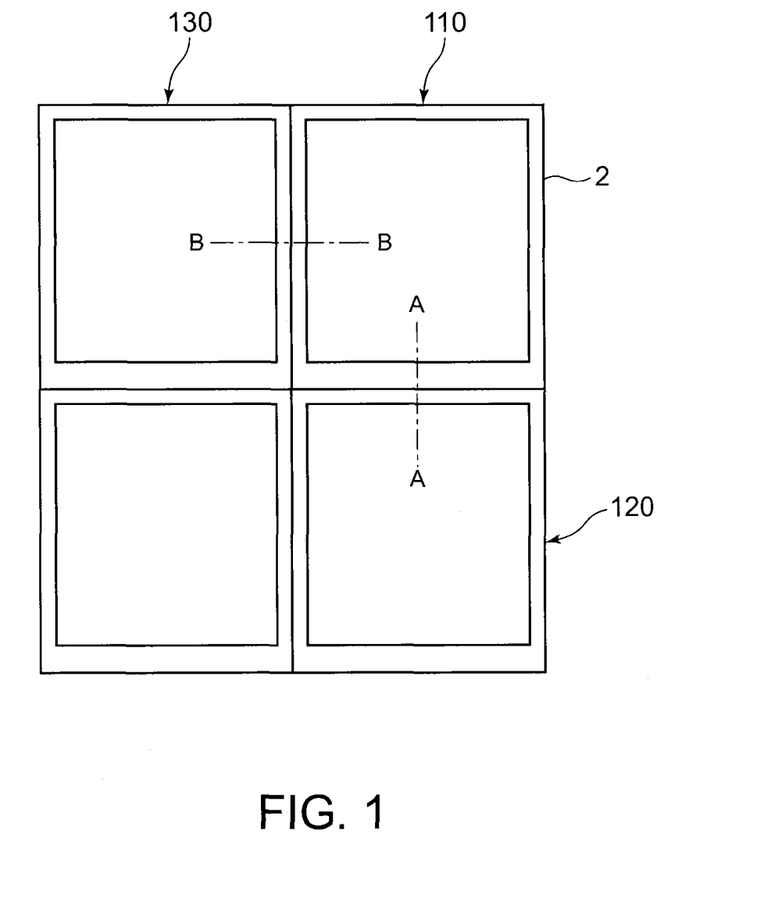
FIG. 1 is a figure schematically showing a portion of a mother substrate in which a plurality of liquid crystal display panels is formed according to an embodiment.

FIG. 1 is a figure schematically showing a portion of a mother substrate in which a plurality of liquid crystal display panels is formed according to an embodiment.

In the mother substrate, a liquid crystal display panel 120 is arranged adjacent to a liquid crystal display panel 110 in a first direction, and a liquid crystal display panel 130 is arranged adjacent to the liquid crystal display panel 110 in a second direction orthogonally crossing the first direction.

The display area 101 of the liquid crystal display panel 110 is arranged more adjacent to the display area 101 in the liquid crystal display panel 130 than the display area 101 in the liquid crystal display panel 120. That is, the distance between the display areas 101 in the liquid crystal display panel 110 and the liquid crystal panel 130 is smaller than the distance between the display areas 101 in the liquid crystal display panel 110 and the liquid crystal display panel 120.

Figure 2:
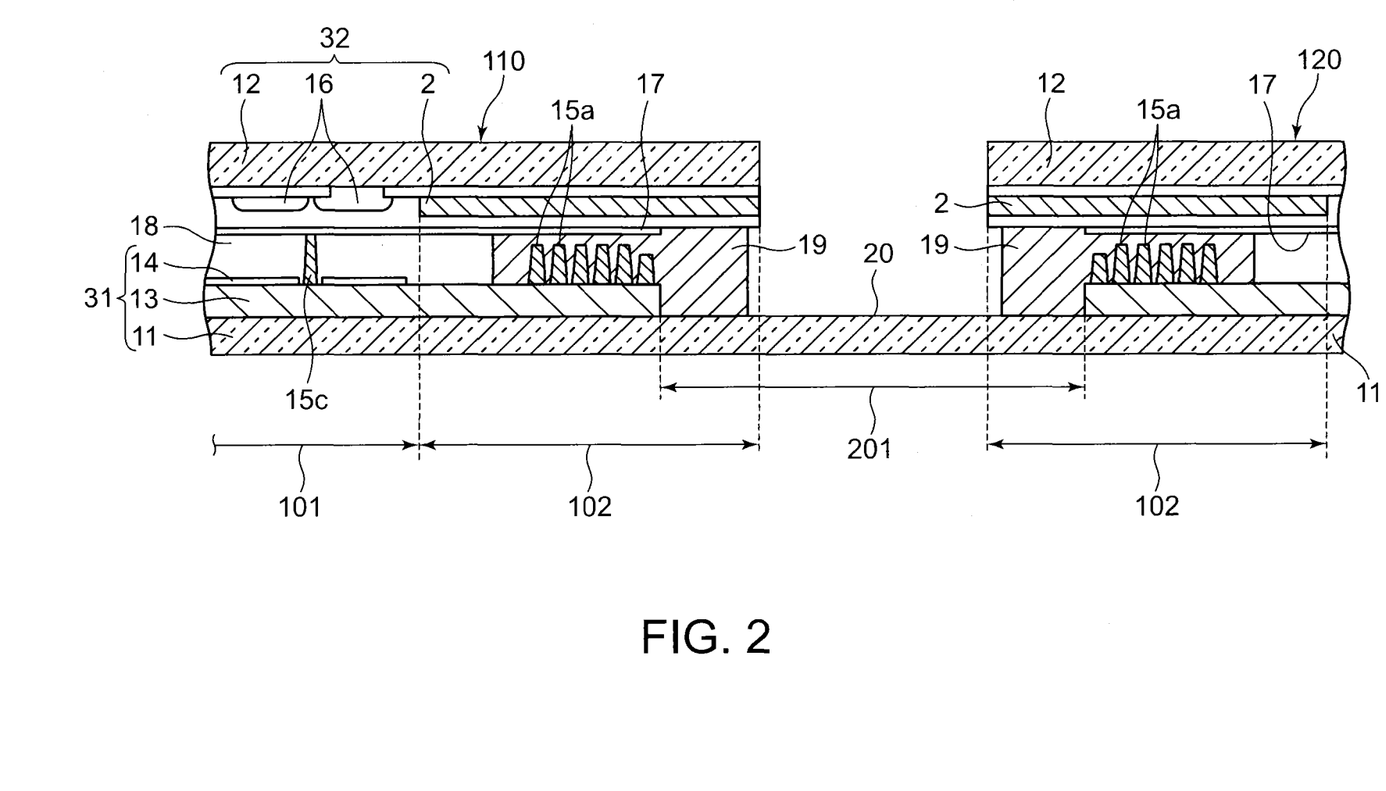
FIG. 2 is a figure schematically showing a cross-sectional structure of the liquid crystal display panel taken along line A-A shown 1 according to the embodiment.
Figure 3:
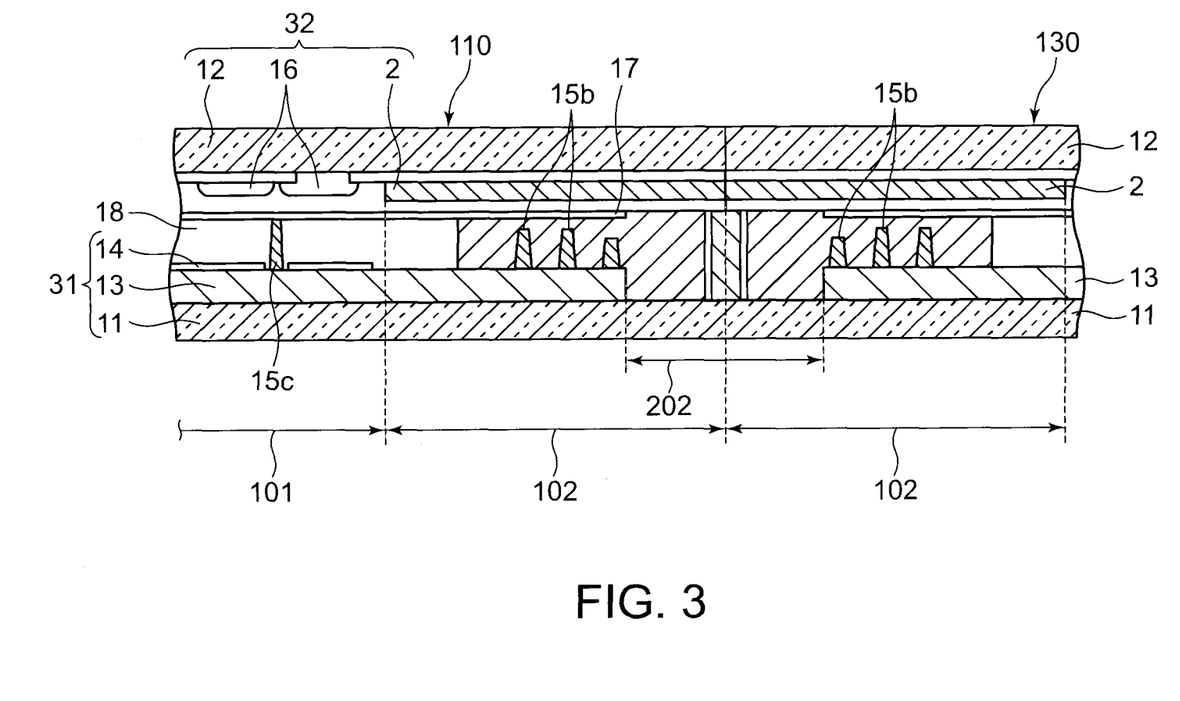
FIG. 3 is a figure schematically showing a cross-sectional structure of the liquid crystal display panel taken along line B-B shown 1 according to the embodiment.

FIG. 2 is a figure schematically showing a cross-sectional structure of the liquid crystal display panel taken along line A-A shown 1 according to the embodiment. FIG. 3 is a figure schematically showing a cross-sectional structure of the liquid crystal display panel taken along line B-B shown 1 according to the embodiment.

The liquid crystal display panel 110 includes an array substrate 31 and a counter substrate 32 as shown in the figure. The array substrate 31 includes a first substrate 11, an under-resin layer 13 formed on one principal surface of the first substrate 11, and a plurality of pixel electrodes 14 formed on the under-resin layer 13 in the shape of a matrix, constituting the display area 101.

On the other hand, the counter substrate 32 is arranged facing the array substrate 31 and includes a second substrate 12, a color filter layer 16 formed on the second substrate 12 in the display area 101, a shield layer 2 formed on the second substrate 12 in the peripheral area 102 for shielding the peripheral area 102, and a common electrode 17.

The seal material 19 pastes the array substrate 31 and the counter substrate 32 in the peripheral area 102 adjacent to the display area 101. The plurality of spacers 15a is formed on the under-resin layer 13 in the peripheral area 102, and arranged in the seal material 19.

The liquid crystal layer 18 is held in a space surrounded with the array substrate 31, the counter substrate 32, and the seal material 19. Also in the display area 101, spacers 15c are arranged on the under-resin layer 13. The spacers 15c are arranged in the liquid crystal layer 18.

The display panel 110 includes a mounting portion 20 in which ICs are mounted after the respective display panels 110 and 120 are cut down in pieces. The mounting portion 20 is provided on the lower side of the display panel 110 in the figure. Accordingly, the mounting portion 20 is arranged on the first substrate 11 between the peripheral areas 102 of the display panel 110 and the display panel 120 as shown in FIGS. 1 and 2.

On the other hand, the mounting portion 20 is not formed between the peripheral areas 102 of the display panel 110 and the display panel 130 to mount the ICs. Accordingly, the distance between the display areas 101 of the liquid crystal display panel 110 and the adjoining liquid crystal display panel 130 is smaller than the distance between the display areas 101 of the display panel 110 and the adjoining display panel 120.

The plurality of pillar-shaped spacers 15b is formed on the under-resin layer 13 in the seal material 19 arranged in the peripheral area 102.

As shown in FIGS. 2 and 3, the spacer area density of the spacers 15a arranged in the mounting end of the peripheral area 102 adjacent to the mounting portion 20 is larger than the spacer density of the pillar-shaped spacers 15b arranged in the other ends of the peripheral area not adjacent to the mounting portion.

In the pillar-shaped spacer in the seal material 19, the seal material invades between a top portion of the pillar shaped-spacer and the counter substrate 32, and contacts with the counter substrate 32 through the seal material 19. Here, the thickness of the seal material 19 between the top portion of the pillar-shaped spacer and the counter substrate 32 is called invaded seal material amount. In addition, the seal material 19 includes filler which is formed of a spherical particulate, such as silica (SiO2).

A first optical element such as a polarization plate and a retardation film is arranged on one external surface of the array substrate 31. Moreover, a second optical element is arranged on one external surface of the counter substrate 32.

Figure 4:
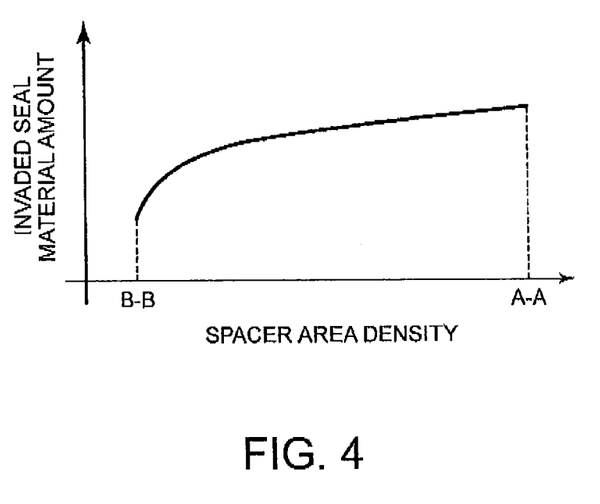
FIG. 4 is a graph showing a relation between a spacer area density and invaded seal material amount between a counter substrate and a top portion of a pillar-shaped spacer.

FIG. 4 is a graph showing a relation between the spacer area density of the spacers and the invaded seal material amount between the counter substrate 32 and the top portion of the pillar-shaped spacer.

The invaded seal material amount becomes larger as the spacer area density becomes higher as shown in FIG. 4. The spacer height in the peripheral area 102 is smaller than the spacer height in the display area 101, and specifically, much smaller at the end of the peripheral area 102 adjacent to the mounting portion 20. Accordingly, in this embodiment, the spacer area density of the spacers in the peripheral area 102 is adjusted to control the spacer height. Since the spacer area density at the mounting end adjacent to the mounting portion 20 is the smallest, the spacer area density thereof is set larger than that at other ends of the peripheral area 102. Accordingly, display unevenness due to the gravity unevenness is suppressed.

Figure 5:
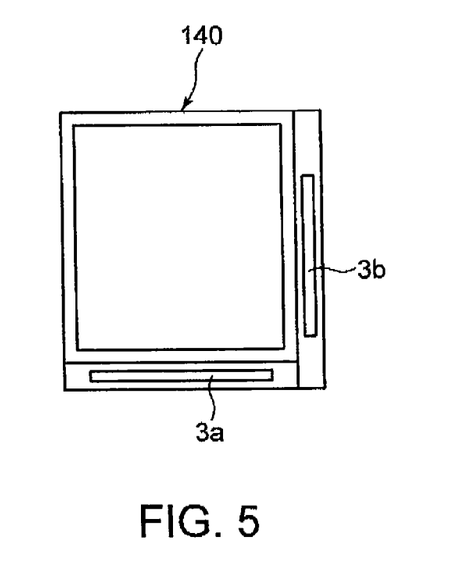
FIG. 5 is a figure showing a structure according to another embodiment.

FIG. 5 is a figure showing a structure of the liquid crystal display panel according to another embodiment.

While in the liquid crystal display panels 110, 120, and 130 shown in FIG. 1 to FIG. 3, the ICs are mounted at one mounting portion 20 adjacent to the mounting end of the peripheral area 102, the liquid crystal display panel 140 is equipped with ICs formed at two mounting portions 20 adjacent to the mounting ends of the peripheral area 102 as shown in FIG. 5.

Next, one example for manufacturing the liquid crystal display device according to the embodiment is explained.

First, as shown in FIGS. 2 and 3, the under-resin layer 13 is formed on the glass substrate 11 using a slit coater, and patterned to expose the first substrate forming a step between the under-resin layer 13 and the glass substrate 11. Then, the pixel electrodes 14 in the matrix shape are formed on the under-resin layer 13. Successively, a resin layer for forming the pillar-shaped spacer is formed on the display area 101, the peripheral area 102, and the mounting portion 20. Furthermore, the resin layer is patterned to form the pillar-shaped spacers. Thereby, the array substrate 31 is completed.

Furthermore, the color filter is formed in the display area 101, and the shield layer 2 is formed in the peripheral area 102 on the glass substrate 12, respectively. Then, the common electrode 17 is formed through an insulating layer. Thereby, the counter substrate 32 is obtained. The array substrate 31 and the counter substrate 32 are pasted by the seal material 19 in the respective peripheral areas 102.

The liquid crystal materials 18 are enclosed in the gap surrounded with the array substrate 31, the counter substrate 32, and the seal material 19 by the ODF method. Then, the ICs are mounted in a predetermined position of the mounting portion 20, and the liquid crystal display device is completed.

The pillar-shaped spacers 15a and 15b in the seal material 19 are formed simultaneously with the spacer 15c in the display area 101. The pattern end of the under resin layer 13 extends to a portion of the seal material 19 on the array substrate. The spacers 15a and 15b are formed in the pattern end portion of the under-resin layer 13. Since, the thickness of the resin layer for forming the pillar-shaped spacer more decreases at the ends than the center of the under-resin layer 13 by the leveling phenomenon, the height of the spacers 15a and 15b becomes lower than the height of the spacer 15c in the display area 101.

When forming the pillar-shaped spacers 15a and 15b in the peripheral area 102 by resin layer, the resin layer is formed on the patterned under-resin layer 13 and the exposed first substrate 11 between the patterned ends of under-resin layer 13 in the adjacent display panels. Then, the resin layer is patterned to form the pillar-shaped spacers. The under-resin layer 13 on the first substrate 11 is partially removed by an etching process in a portion of the peripheral area 102 and the mounting portion 20. In the formation of the resin layer, the leveling phenomenon occurs on the under-resin layer 13 and the mounting portion 12 as explained above because a step is formed therebetween. As shown in FIG. 2, the under-resin layer 13 in the peripheral area 102 and the adjacent mounting portion 20 is more widely removed than that in the peripheral area 102 not adjacent to the mounting portion 20 as shown in FIG. 3. The width 201 between the ends of the under-resin layers 13 in the adjacent display panels 110 and 120 is larger than the width 202 between the ends of the under-resin layers 13 in the adjacent display panels 110 and 130. Accordingly, the thickness of the resin layer of the peripheral area 102 adjacent to the mounting portion 20 becomes thinner than the thickness in the peripheral area 102 not adjacent to the mounting portion 20 by the leveling phenomenon of the resin layer. Consequently, the height of the pillar-shaped spacer 15a arranged adjacent to the mounting portion becomes lower than the height of the pillar-shaped spacer 15b not adjacent to the mounting portion 20.

Figure 6:
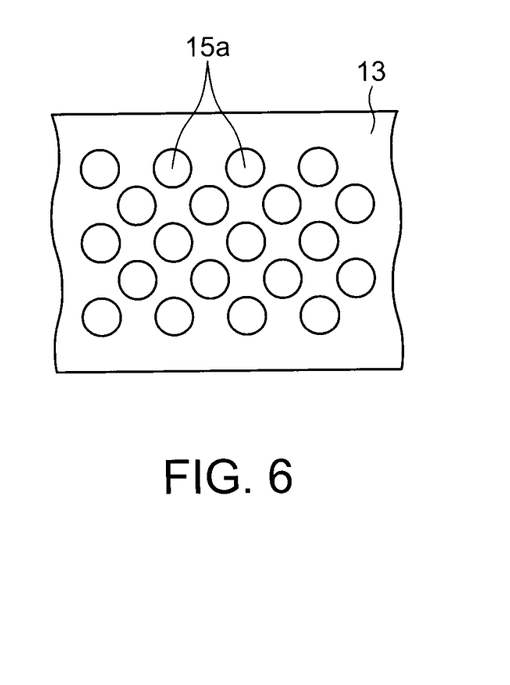
FIG. 6 is a figure showing the spacer area density of pillar-shaped spacers arranged in a peripheral area adjacent to a mounting portion of an array substrate.
Figure 7:
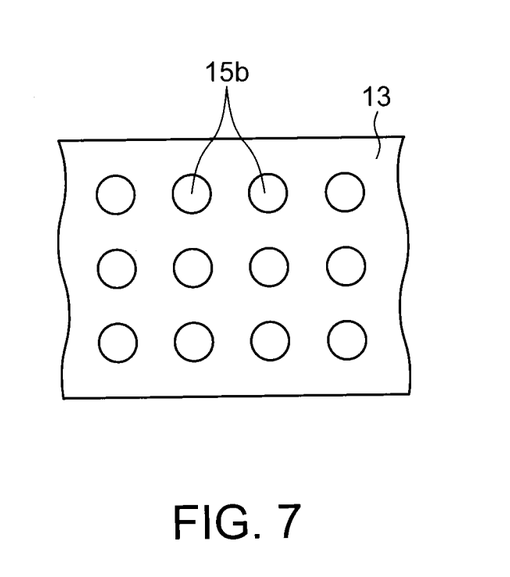
FIG. 7 is a figure showing the spacer area density of the pillar-shaped spacers arranged in the peripheral area not adjacent to the mounting portion.

Therefore, in this embodiment, the spacer area density of the pillar-shaped spacers 15a arranged in the peripheral area 102 adjacent to the mounting portion 20 is more highly set compared with the spacer area density of the pillar-shaped spacers arranged in other peripheral areas 102 not adjacent to the mounting portion 20. Here, FIG. 6 shows the spacer area density of the pillar-shaped spacer 15a formed in the peripheral area 102 adjacent to the mounting portion 20, and FIG. 7 shows the spacer area density of the pillar-shaped spacer 15b formed in the peripheral area 102 not adjacent to the mounting portion 20.

Here, the pillar-shaped spacers 15a are arranged so that the spacer area density of the spacers 15a is formed higher than the spacer area density of the spacers 15b. That is, additional spacers are arranged among the spacers 15b in a houndstooth check shape, thereby the spacer area density is raised.

Thereby, the invaded seal material amount between the top portion of the pillar-shaped spacer and the counter substrate 32 increases, and it becomes possible to keep the display quality uniform without depending on the height of the seal material 19 and the ends of the display panel. Furthermore, in the ODF method, the seal material 19 in the mounting ends of the peripheral area 102 adjacent to the mounting portion 20 is not crashed. Accordingly, the gap between the array substrate 31 and the counter substrate 32 are kept constant, and the generation of the gravity unevenness is controlled as well as other ends of the display panel.

COMPARATIVE EXAMPLE

As comparison, the space area densities of the pillar-shaped spacers in the peripheral areas 102 of four ends of the display panel is set equal without increasing the number of the pillar-shape spacers arranged at the mounting end adjacent to the mounting portion 20. The amount of the invaded seal material becomes the same for the four ends. Therefore, only the gap in the peripheral area 102 adjacent to the mounting portion 20 becomes small reflecting the height of the pillar-shaped spacers 15a in the peripheral area 102. As a result, in the peripheral are 102 adjacent to the mounting portion 20, the seal material 19 is crashed and the gravity unevenness is generated.

As mentioned above, according to this embodiment, the spacer area density of the pillar-shaped spacers 15a arranged adjacent to the mounting portion 20 is set larger than the spacer area density of the pillar-shaped spacers 15b arranged in the other peripheral areas 102. Therefore, the invaded seal material amount increases, and substantially the same cell gap between the array substrate 31 and the counter substrate 32 is obtained in the whole peripheral area 102. Accordingly, the cell gap in the peripheral area 102 is kept constant for the four ends. Particularly, it becomes possible to suppress the generation of the gravity unevenness by eliminating the failure that the cell gap is too small in the peripheral area 102 adjacent to the mounting portion 20.

In this embodiment, although only the manufacturing method using the ODF method is explained, other injecting method can be applied. Moreover, although only the structure in which the pillar-shaped spacers are arranged on the array substrate 31 is explained, the structure in which the pillar-shaped spacers are arranged on the counter substrate 32 can be applied, and the same effect is achieved.

While certain embodiments have been described, the embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:

1. A liquid crystal display device, comprising:
an array substrate including an under-resin layer formed on the array substrate, a plurality of pixel electrodes formed on the under-resin layer in a matrix shape and forming a display area, and an integrated circuit mounted on a mounting portion located apart from the under-resin layer;
a counter substrate arranged facing the array substrate and including a shield layer formed on the counter substrate for shielding a peripheral area surrounding the display area;
a seal material for attaching the array substrate and the counter substrate at a seal region in the peripheral area;
spacers including a first spacer arranged in the display area, and second spacers arranged in the seal region; and
a liquid crystal layer held in a space surrounded with the array substrate, the counter substrate, and the seal material;
wherein the under-resin layer is exposed from the array substrate on an end portion of the array substrate facing an end portion of the counter substrate,
the seal material contacts the exposed end portion of the array substrate in the seal region,
a height of the second spacers arranged in the seal region adjacent to the mounting portion is smaller than a height of the second spacers arranged in the seal region not adjacent to the mounting portion,
second spacers arranged in the seal region adjacent to the mounting portion are arranged in a houndstooth check shape, the houndstooth check shape comprises second spacers arranged in the seal region adjacent to the mounting portion and additional spacers interposed between the second spacers in the seal region adjacent to the mounting portion, thereby the spacer area density of the second spacers arranged in the seal region adjacent to the mounting portion is higher than the spacer area density of the second spacers arranged in the seal region not adjacent to the mounting portion, the spacer area density is a ratio of total cross-sectional areas of the second spacers arranged in a unit area to the unit area.

2. The liquid crystal display device according to claim 1, wherein the seal material includes a silica as a filler.

3. The liquid crystal display device according to claim 1, wherein
the seal material is arranged between the counter substrate and the under-resin layer, and between the counter substrate and the array substrate in the peripheral area, and attaches the array substrate and the counter substrate.

4. The liquid crystal display device according to claim 1, wherein
the display device includes four ends, and at least two mounting portions are arranged adjacent to the respective ends.

5. A liquid crystal display device, comprising:
an array substrate including an under-resin layer formed on the array substrate, a plurality of pixel electrodes formed on the under-resin layer in a matrix shape and forming a display area, and an integrated circuit mounted on a mounting portion located apart from the under-resin layer;
a counter substrate arranged facing the array substrate and including a shield layer formed on the counter substrate for shielding a peripheral area surrounding the display area;
a seal material for attaching the array substrate and the counter substrate at a seal region in the peripheral area, the seal material arranged between the counter substrate and the under-resin layer, and between the counter substrate and the array substrate in the peripheral area;
spacers including a first spacer arranged in the display area, and second spacers arranged in the seal region; and
a liquid crystal layer held in a space surrounded with the array substrate, the counter substrate, and the seal material;
wherein the under-resin layer is exposed from the array substrate on an end portion of the array substrate facing an end portion of the counter substrate,
the seal material contacts the exposed end portion of the array substrate in the seal region,
spacer area density of second spacers arranged in the seal region adjacent to the mounting portion is higher than the spacer area density of the second spacers arranged in the seal region not adjacent to the mounting portion,
the spacer area density is a ratio of total cross-sectional areas of the second spacers arranged in a unit area to the unit area,
the under-resin layer includes an end forming a step between its end and the array substrate,
a height of the second spacers arranged in the seal region adjacent to the mounting portion is smaller than a height of the second spacers arranged in the seal region not adjacent to the mounting portion,
a height of a second spacers closest to the end of the under-resin layer in the seal region adjacent to the mounting portion is smaller than a height of other second spacers in the seal region adjacent to the mounting portion,
the amount of the seal material interposed between a top portion of the second spacers arranged in the seal region adjacent to the mounting portion and the counter substrate is more than the amount of the seal material interposed between a top portion of other second spacers in the seal region not adjacent to the mounting portion and the counter substrate.

6. The liquid crystal display device according to claim 5, wherein the seal material includes a silica as a filler.

7. The liquid crystal display device according to claim 5, wherein the display device includes four ends, and at least two mounting portions are arranged adjacent to the respective ends.

* * * * *